US012602577B2

(12) United States Patent
Park et al.

(10) Patent No.: US 12,602,577 B2
(45) Date of Patent: Apr. 14, 2026

(54) NEURON CORE WITH TIME-EMBEDDED FLOATING POINT ARITHMETIC

(71) Applicant: KOREA INSTITUTE OF SCIENCE AND TECHNOLOGY, Seoul (KR)

(72) Inventors: Jong Kil Park, Seoul (KR); In Ho Kim, Seoul (KR); Su Youn Lee, Seoul (KR); Jong Keuk Park, Seoul (KR); Joon Young Kwak, Seoul (KR); Jae Wook Kim, Seoul (KR); Yeon Joo Jeong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1050 days.

(21) Appl. No.: 17/579,400

(22) Filed: Jan. 19, 2022

(65) Prior Publication Data

US 2022/0230059 A1      Jul. 21, 2022

(30) Foreign Application Priority Data

Jan. 21, 2021    (KR) ........................ 10-2021-0008769

(51) Int. Cl.
| | |
|---|---|
| *G06N 3/065* | (2023.01) |
| *G06F 7/483* | (2006.01) |
| *G06N 3/049* | (2023.01) |
| *G06N 3/0499* | (2023.01) |
| *G06N 3/063* | (2023.01) |
| *G06N 3/08* | (2023.01) |

(52) U.S. Cl.
CPC ............. *G06N 3/065* (2023.01); *G06F 7/483* (2013.01); *G06N 3/049* (2013.01); *G06N 3/08* (2013.01)

(58) Field of Classification Search
CPC .......... G06N 3/065; G06N 3/049; G06N 3/08; G06N 3/063; G06F 7/483
See application file for complete search history.

(56) References Cited

U.S. PATENT DOCUMENTS

| | | | | |
|---|---|---|---|---|
| 12,217,158 B2 * | 2/2025 | Sun | ........................ | G06N 3/063 |
| 2018/0075345 A1 * | 3/2018 | Gottfried | ............... | G06N 3/049 |

(Continued)

OTHER PUBLICATIONS

Spiking Neural Network (Wikipedia, published Jan. 15, 2021) (Year: 2021).*

*Primary Examiner* — Jennifer N Welch
*Assistant Examiner* — Jake Timothy Breen
(74) *Attorney, Agent, or Firm* — Rabin & Berdo, P.C.

(57) ABSTRACT

Provided is a method of operating a neuron in a neuromorphic system. The method includes evaluating a membrane potential value at a corresponding time when receiving an input spike, time-modulating a synaptic weight of the membrane potential value and converting the time-modulated synaptic weight into a membrane potential value at a reference time, and generating an output spike when the membrane potential value at the reference time exceeds a certain threshold value. The membrane potential value at the reference time is represented by a floating point number including a predetermined bit of exponent and mantissa, and the floating point number includes time information. The method further includes accessing a memory and scanning a neural state variable when a timer is updated to "0" to update the neural state variable to an updated value at a reference time.

12 Claims, 8 Drawing Sheets

(56)         References Cited

U.S. PATENT DOCUMENTS

| 2018/0107922 | A1* | 4/2018 | Paul | ........................ | G06N 3/088 |
| 2019/0122106 | A1* | 4/2019 | Lee | ........................ | G06N 3/063 |
| 2019/0392299 | A1* | 12/2019 | Ma | ........................ | H03K 19/21 |
| 2020/0143229 | A1* | 5/2020 | Van Der Made | ...... | G06N 3/088 |

* cited by examiner

```
function floatArithmetic
input A, B, Arithmetic
output C
    exponent = max(A exponent, B exponent)
    diff = abs(A exponent – B exponent)
    if exponent == A exponent
        mantissa = arithmetic(A mantissa, B mantissa >> diff)
    else exponent == B exponent
        mantissa = arithmetic(A mantissa >> diff, B mantissa)
    C = normalize(exponent, mantissa)
end function
```

| | Exponent | | Mantissa | |
|---|---|---|---|---|
| | 3 | 3 | 4 | 6 |
| $T_{\tau m}(t_{now})$ + | 1 | | 15 | |
| $T_{\tau m}(t_{now})$ | 6 | | 10 | |
| $V(t_{pre})^{6}$ ⊕ | 6 | | 10 | |
| $V(t_{now})^{6}$ ≈ | 6 | | 10 | |

NEURON CORE WITH TIME-EMBEDDED FLOATING POINT ARITHMETIC

CROSS-REFERENCE TO RELATED APPLICATION

This application claims priority to and the benefit of Korean Patent Application No. 2021-0008769, filed on Jan. 21, 2021, the disclosure of which is incorporated herein by reference in its entirety.

BACKGROUND

1. Field of the Invention

The present invention relates to a neuron core, and more particularly, to a floating point precision digital neuron core using time-embedded floating point arithmetic.

2. Discussion of Related Art

Recently, many large-scale neuromorphic systems implementing spiking neural networks mimicking bio-inspired artificial intelligence have been proposed. The systems abstract working principles of biological brains to build energy-efficient intelligent hardware platforms. Neurons and synapses are known to basic computational units in the biological brain and are manufactured into a silicon chip. What the most important parameters for mimicking the biological brain in view of function and structure are is still unknown. Biological evidence, however, still emphasizes that a log-normal distribution of brain properties including synapse efficiency plays an important role in the biological brain. However, focusing a scale-up issue for building large-scale systems within a limited silicon area causes excess optimization, such as binarizing neurons and synapse model parameters while ignoring these important characteristics, which results in designing a system without biological plausibility.

A floating point precision operation is needed to implement a log-normal distribution of neural and synaptic dynamics. Analog neuromorphic systems support floating point precision synaptic dynamics by the nature of analog device characteristics in the subthreshold operation regime. Noise and variability of analog devices, however, cause difficulties in controlling and calibrating neural and synaptic operation. On the other hand, digital neuromorphic systems can represent floating point precision in a precise and controllable manner, but floating point arithmetic operations have high energy costs, and therefore, tend to be avoided for use in the digital neuromorphic systems. Although some recent digital neuromorphic hardware uses floating point arithmetic, many recent digital neuromorphic systems use fixed-point and integer systems for representing neural and synaptic states.

In the digital neuromorphic systems, neurons are implemented with a memory and an arithmetic unit. The memory stores state variables such as membrane potential and timestamp, and the arithmetic unit calculates synaptic updates upon synaptic events. The neural operation includes two steps. First, the membrane potential is updated by a presynaptic event. When the presynaptic event is received, the neuron membrane potential is updated using the presynaptic event information based on the defined neuron model, and when the neuron membrane potential exceeds a predetermined threshold level, the neuron generates a spike. Second, temporal dynamics of state variables are evaluated at every time step to calculate the effect of leakage dynamics. Usually, this step requires additional access to the memory to read the state variables stored in the memory. Many other systems have focused on optimizing the arithmetic operations required at the first step of the neuron operation to reduce the overall power consumption. This leads to over-optimization of neural and synaptic parameters. However, indeed, memory access operations consume more energy than performing the floating point precision arithmetic operation. It means that it would better to minimize redundant memory access in the second step rather than optimize energy cost for the arithmetic operation in the first step to reduce overall dynamic power consumption of the system.

SUMMARY OF THE INVENTION

The present invention is directed to providing a new neuron implementation model using a time-embedded floating point unit for floating point precision neural and synaptic dynamics.

According to an aspect of the present invention, there is provided a method of operating a neuron in a neuromorphic system. The method includes, when receiving an input spike, evaluating a membrane potential value at a corresponding time, time-modulating a synaptic weight of the membrane potential value and converting the time-modulated synaptic weight into a membrane potential value at a reference time, and generating an output spike when the membrane potential value at the reference time exceeds a certain threshold value.

The synaptic weight is converted into the membrane potential value at the reference time by adding a time bias to the synaptic weight. The method of operating a neuron may further include modulating a synaptic weight of a new input spike into the reference time when the new input spike is received, adding the modulated synaptic weight to the membrane potential value at the reference time, and generating an output spike when the added value exceeds the certain threshold value.

The method of operating a neuron may further include accessing a memory and scanning a neural state variable when a timer is updated to "0."

The membrane potential value at the reference time may be represented by a floating point number including a predetermined bit of exponent and mantissa, the floating point number may include time information, and the time information may be valid for a timer cycle.

According to another aspect of the present invention, there is provided a neuron core unit. The neuron core unit includes a controller that converts a membrane potential value at the current time into a reference time for an input synaptic event and outputs an output spike when a membrane potential value at the converted reference time exceeds a certain threshold value, and a memory that includes a neural state variable.

A synaptic weight may be converted into the membrane potential value at the reference time by adding a time bias to the synaptic weight of the membrane potential value. The controller may modulate the synaptic weight of a new input spike to the reference time using a second time bias when the new input spike is received, add the modulated synaptic weight to the membrane potential value at reference time, and generate an output spike when the added value exceeds a certain threshold value.

The controller may access the memory and scan a state variable when a timer is updated to "0."

The membrane potential value at the reference time may be represented by a floating point number including a predetermined bit of exponent and mantissa, the floating point number may include time information, and the time information may be valid for a timer cycle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figures 1, 2:
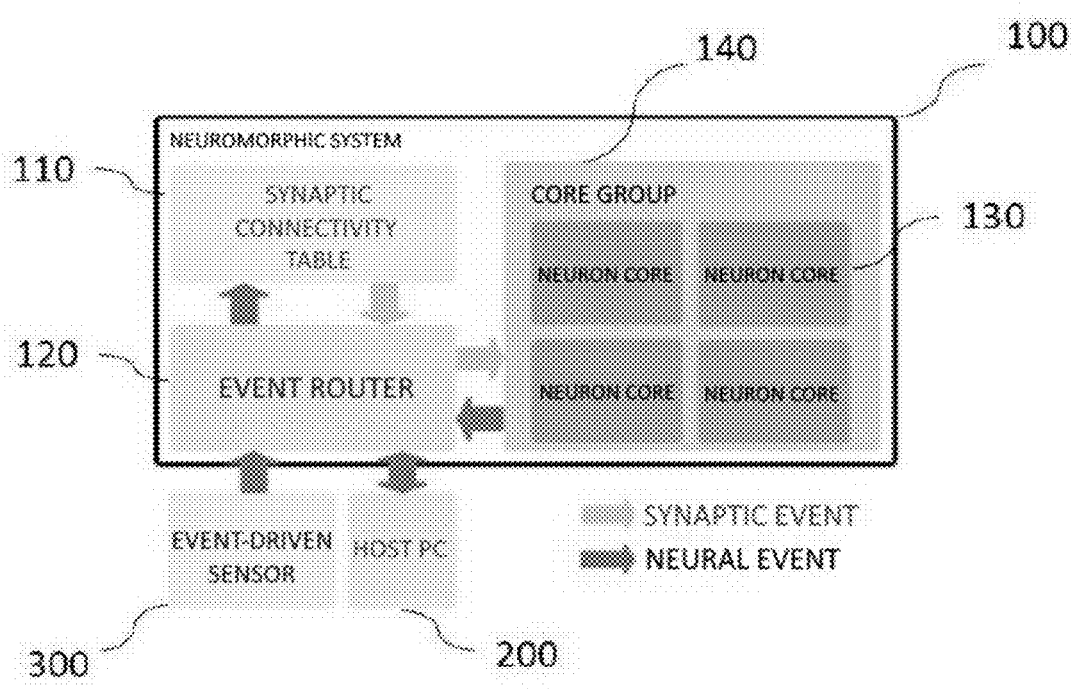
FIG. 1 is a block diagram of a large-scale neuromorphic system according to an embodiment of the present invention.
FIG. 2 is a diagram illustrating a pseudocode of a floating point algorithm according to an embodiment of the present invention.

Hereinafter, embodiments of the present invention will be described in detail with reference to the accompanying drawings so that those skilled in the art may easily practice the present invention. However, the present invention may be implemented in various different forms and is not limited to embodiments described herein. In addition, in the drawings, portions unrelated to the description will be omitted to clearly describe the present invention, and similar portions will be denoted by similar reference numerals throughout the specification.

FIG. 1 is a block diagram of a large-scale neuromorphic system 100 according to an embodiment of the present invention. Referring to FIG. 1, the neuromorphic system 100 includes a synaptic connectivity table 110, an event router 120, and a core group 140 including a plurality of neuron cores 130. The neuromorphic system 100 is designed to process a neural spike event input from an event-driven sensor 300 and a host PC 200 that transmits a user interaction spike event. The synaptic connectivity table 110 stores postsynaptic events encoded in address events indicating a postsynaptic neuron address in a destination neuron core and synaptic information (for example, synaptic weights and types). The address event encoding schemes may be different depending on event routing architectures. The synaptic connectivity table 110 may be implemented in internal and external memories. The neuron core 130 is an array of neurons, and processes an input synaptic event based on an implemented neuron model, and generates an output neural spike. The event router 120 controls a flow of neural events and synaptic events between the event-driven sensor 300, the host personal computer (PC) 200, the neuron core 130, and the synaptic connectivity table 110. When the neuron core 130 generates the neural spike, the event router 120 receives the spike and reads a postsynaptic event from the synaptic connectivity table 110. Then, the event router 120 distributes the postsynaptic event to neurons in the neuron core 130. An event routing architecture design is an important consideration in the design of the large-scale neuromorphic system. In the present specification, the implementation of a neuron core with a new neuron implementation model and architecture will be mainly described.

A floating point number may represent a number having various sizes with a fixed number of digits. A customized half-precision (16 bits) floating point format is used to optimize floating point units and memory spaces. The customized format does not consider negative exponents. Therefore, a floating point arithmetic algorithm may be simply represented as in FIG. 2. FIG. 2 illustrates a pseudo code of the implemented floating point algorithm.

The custom half-precision floating point format is represented by 6-bit exponent and 10-bit mantissa as shown in Expression 1 below.

$$(1+M)\times 2^{E} \qquad \text{[Expression 1]}$$

In Expression 1, E is an exponent value representing a power of 2 encoded in 6 bits, and M is a mantissa value representing numbers below a decimal number encoded in 10 bits $$\left(\sum_{n=1}^{10}\frac{1}{2^{n}}\right)$$

Hereinafter, a leaky integrate-and-fire neuron model will be described. A neuron is a basic computation unit in neuromorphic hardware. Among bio-inspired neuron models, a leaky integrate-and-fire neuron model is popularly used because of its simple and rational biological plausibility. The leaky integrate-and-fire neuron model integrates charges to a membrane and generates a spike when the membrane potential exceeds a certain threshold value. The simple leaky integrate-and-fire neuron model can be formulated as Expression 2 below.

$$\tau_m \frac{dV(t)}{dt} = -V(t) + RI(t) \qquad \text{[Expression 2]}$$

If $V(t) \geq V_{th}$, then $V(t) = V_r$. In Expression 2, $V(t)$ denotes a neuron's membrane potential at time t, $\tau_m$ denotes a membrane time constant, R denotes a membrane resistance, $I(t)$ denotes a synaptic current which includes excitatory and inhibitory synaptic currents. When the membrane potential is greater than or equal to a threshold value $V_{th}$, the neuron fires a spike, and the membrane potential value at that time stem is set to a reset value $V_r$.

A new neuron implementation model according to an embodiment of the present invention uses a so-called "time-embedded floating point arithmetic" in the leaky integrate-and-fire neuron model formulated in Expression 2. The time-embedded floating point arithmetic means that the floating point number in the system includes temporal information. Expression 3 below formulates an evaluation step for the membrane potential value at time t using the time-embedded floating point arithmetic. A solution of a differential Expression (Expression 2) with an initial condition, $V(t) = V_0$, is shown in Expression 3 below.

$$V(t) = V_0 e^{-t/\tau m} + RI(t) \qquad \text{[Expression 3]}$$

In Expression 3, $V_0$ denotes the neuron's membrane potential at t=0, R denotes the synaptic resistance, and $I(t)$ denotes the synaptic current. $V_0$ denotes an initial value stored in a static random access memory (SRAM). The evaluated membrane potential value $V(t)$ is converted into a value at reference time, t=0, for an initial condition of the next event by the following Expression 4.

$$V(t)_0 = (V_0 e^{-t/\tau m} + RI(t)) e^{t/\tau m}$$

$$= V_0 + RI(t) e^{t/\tau m}$$

$$= V_0 + RI(t) T\tau m(t) \qquad \text{[Expression 4]}$$

If $V(t)_0 \geq V_{th} T\tau m(t)$, then $V(t)_0 = V_r T\tau m(t)$ and the spike is generated.

In Expression 4, $V(t)_0$ denotes the membrane potential value converted into a value at t=0, and $T_{\tau_m}(t)$ denotes a time bias which is a unit-less exponential term for converting a value at t into a value at t=0. The result of Expression 4 shows that the initial value $V_0$ does not need to be evaluated over time. The time-modulated synaptic weight $(RI(t)T_{\tau_m}(t))$ is added to the initial value $V_0$ to convert the evaluated membrane potential $V(t)$ into a value $V(t)_0$ at time t=0. In Expression 4, multiplication of exponential terms may be implemented as floating point addition. Therefore, Expression 4 may be calculated without a multiplication operation in digital hardware.

Figures 3A, 3B:
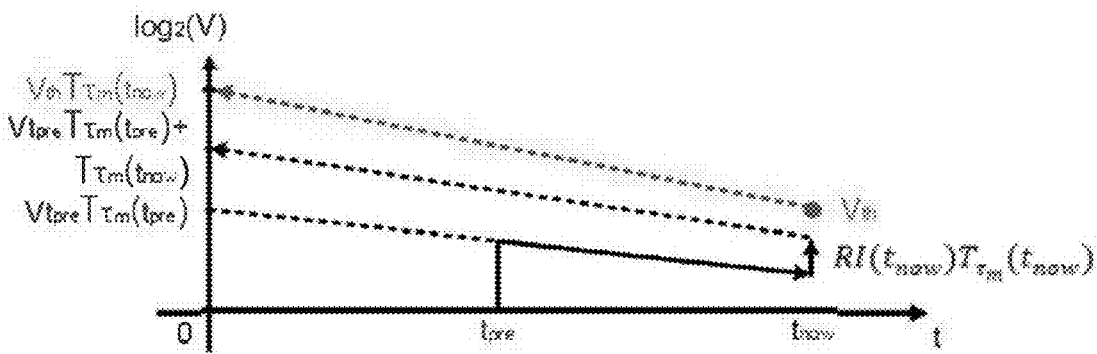
FIG. 3A is a diagram illustrating a membrane potential evaluation step using time-embedded floating point arithmetic according to an embodiment of the present invention.
FIG. 3B is a diagram illustrating a time-modulated membrane potential calculation step in the algorithm according to the embodiment of the present invention.

FIG. 3A illustrates a membrane potential evaluation step using time-embedded floating point arithmetic according to an embodiment of the present invention. In particular, FIG. 3A illustrates an example of the membrane potential evaluation step at time $t = t_{now}$. A solid line in FIG. 3A represents the actual membrane potential value over time. At time $t = t_{pre}$, there is an input spike and a membrane potential set to $V_{t_{pre}}$, and the membrane potential value is converted into a value at time t=0 by adding the time bias $T_{\tau_{in}}(\tau_{pre})$. At time t=tnow, a new input spike is received and time-modulated synaptic weight $RI(t_{now})T_{\tau_m}(t_{now})$ is added to the already stored value $V_{t_{pre}} T_{\tau_m}(t_{pre})$. Accordingly, the calculated result $V_{t_{pre}} T_{\tau_m}(t_{pre}) + RI(t_{now}) T_{\tau_m}(t_{now})$ is the membrane potential value converted from the value of time $t = t_{now}$ to the value of time t=0. To generate the output spike by comparing the membrane potential to the threshold value, the threshold value is also converted into the value at time t=0, and the time-modulated threshold value $(V_{th} T_{\tau_m}(t_{now}))$ is used.

FIG. 3B illustrates a time-modulated membrane potential calculation step in the algorithm according to an embodiment of the present invention. In particular, FIG. 3b illustrates bit alignment for the membrane potential evaluation step, where numbers in a box denote the number of bits. A white box denotes zero padding for bit alignment for an operation. The algorithm according to the present embodiment uses integer and floating point arithmetic. In FIG. 3B, an operator with a circle denotes the floating point arithmetic, and an operator without a circle denotes integer arithmetic. In addition, 16 bits are used to represent a neuron state (membrane potential) with a 6-bit exponent and 10-bit mantissa in floating point format. The synaptic weight is encoded in 8 bits, including 1 bit representing the excitatory and inhibitory synapses, and a floating point number (3-bit exponent and 4-bits) representing synapse strength. In order to align this to the 16-bit membrane potential value, 6 least significant bits (LSB) and 3 most significant bits (MSB) are filled with zero. When the input event is received, the synaptic weight is modulated to a value of time t=0. In the present system, the time bias is shared by all neurons using a timer. The timer is set to count 5 MSBs of the timer for each time constant so that the neuron state value may be divided by 2 every membrane time constant. In the case of the time modulation, the time bias is added to the synaptic weight by the integer addition operation. This is because the integer addition operations on the floating point number are effectively the same with the multiplication of the exponential terms to the floating point number. The time-modulated synaptic weight $RI(t_{now})T_{\tau_m}(t_{now})$ and the neuron state value $v_{t_{pre}0}$ are the floating point numbers. The floating point addition is applied to two values. The floating point addition result $V_{t_{now}}$ is compared with the time-modulated threshold $(V_{th}T_{\tau_m}(t_{now}))$. When the result exceeds the modulated threshold, the spike is generated.

Figure 4A:
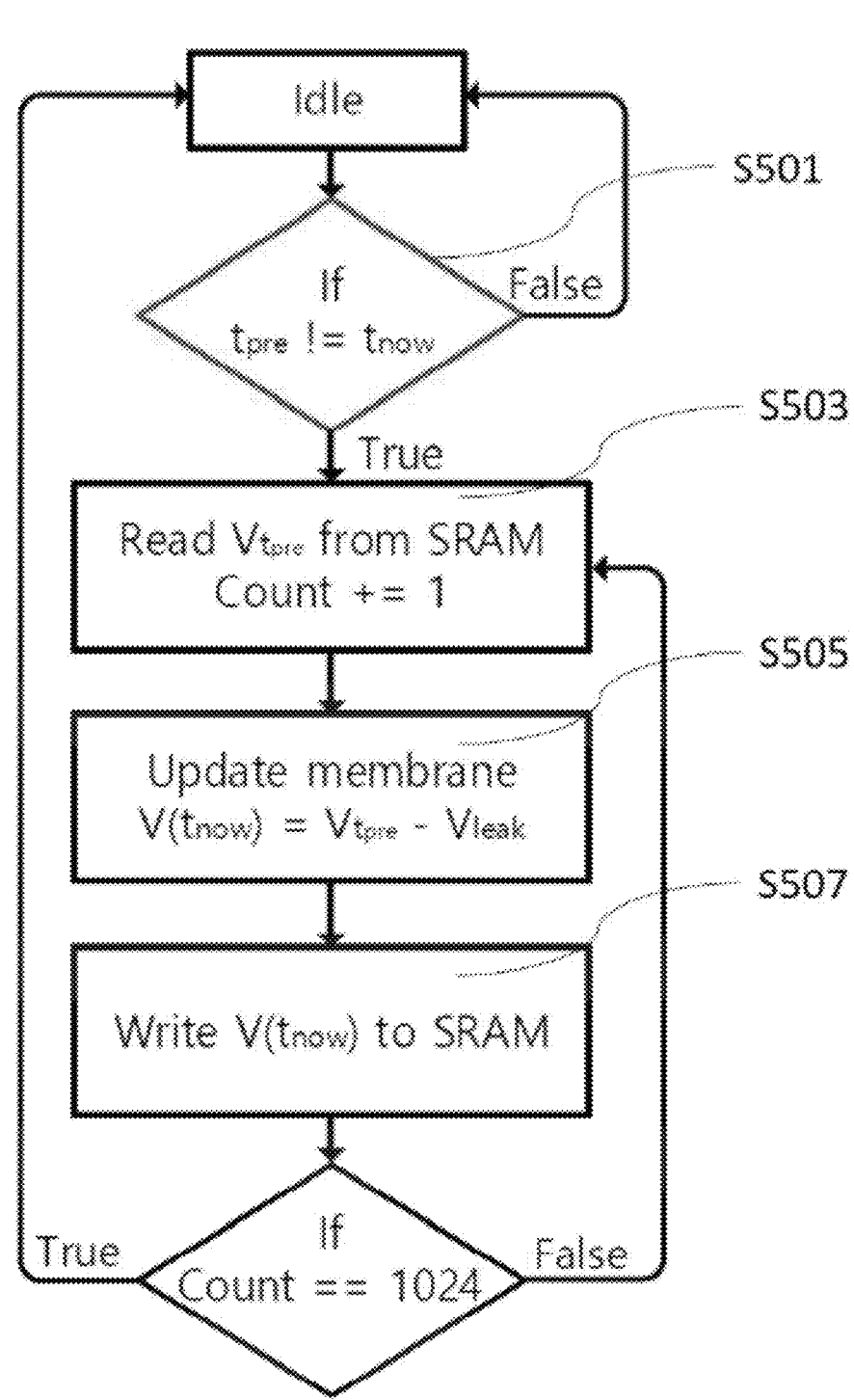
FIG. 4A is a state diagram of a temporal dynamics update process according to a prior art algorithm.
Figure 4B:
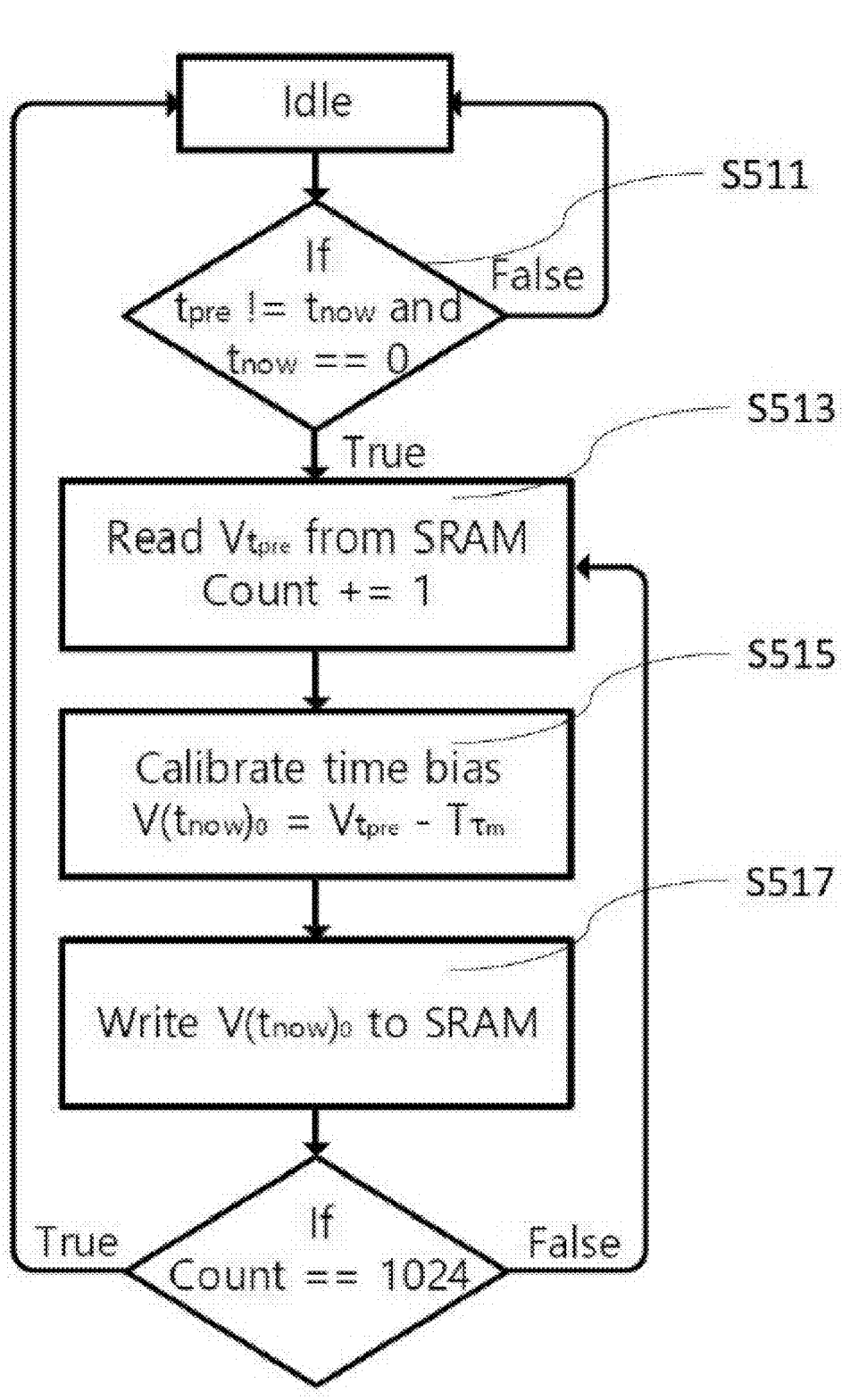
FIG. 4B is a state diagram of a temporal dynamics update process according to an embodiment of the present invention.

FIG. 4A is a state diagram of a temporal dynamics update process according to the conventional algorithm, and FIG. 4B is a state diagram of a temporal dynamics update process according to an embodiment of the present invention. Referring to FIG. 4A, in the conventional algorithm, the state machine is triggered at the change of an array timer which is a unit time step (for example, 1 ms) (S501). That is, at every time step, the state machine accesses the memory, for example, the SRAM, scans all the neural state variables stored in the SRAM (S503), and updates the membrane temporal dynamics (S505). Then, the updated time dynamics are recorded in the SRAM (S507). On the other hand, referring to FIG. 4B, in the algorithm according to an embodiment of the present invention, when the array timer is updated to 0, the state machine is triggered (S511), and the neural state variables of the SRAM are scanned (S513). As a result, the algorithm according to the present invention may reduce the amount of SRAM access compared to the conventional algorithm. Unlike the conventional method that requires access to the SRAM at every time step even when there is no input event, the algorithm according to the present embodiment has the advantage that the algorithm does not need to access the SRAM to decay the membrane potential when there is no input event because the floating point number integrates the temporal information. In the algorithm according to the present embodiment, the time information is valid for an array timer cycle. Therefore, when the array timer reaches 0 again, it is necessary to correct the neuron state value to a value based on the updated reference time t=0 (S515). This correction step is the only step of scanning all the neuron state values in the SRAM when there is no input event in the algorithm according to the present embodiment.

Figure 5:
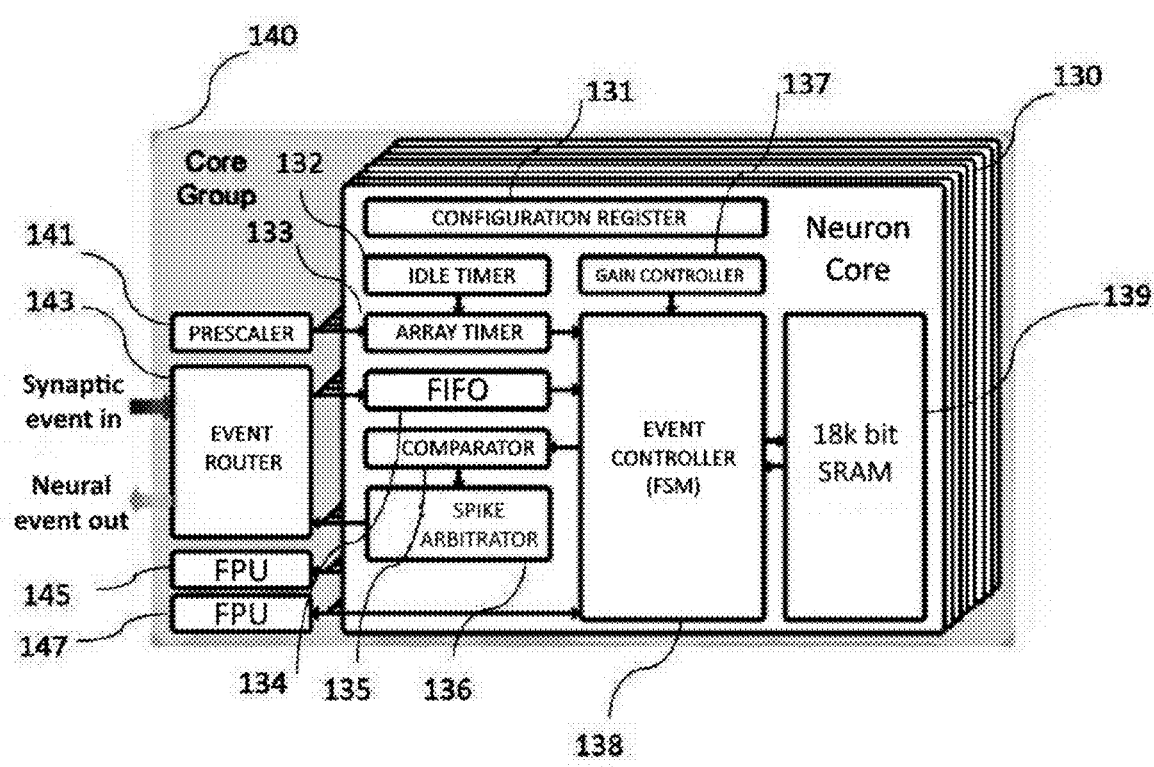
FIG. 5 is a block diagram of a neuron core group implementing a new neuron implementation model according to an embodiment of the present invention.

FIG. 5 is a block diagram of a neuron core group 140 implementing a new neuron implementation model according to an embodiment of the present invention. Referring to FIG. 5, the neuron core group 140 includes 8 neuron cores 130, a prescaler 141, an event router 143, and two floating point units 145 and 147 shared by each of 4 cores. The prescaler 141 has a time resolution of 100 ns and is used to count the array timer 133 in the core. The event router 143 controls neurons and synaptic events encoded in address events. This event router distributes the input synaptic event to the destination neuron of the core and outputs the neural spike to the synaptic connectivity table (101 in FIG. 1) when the neuron of the core generates a neural spike. The input synaptic event is encoded in a 13-bit postsynaptic neuron address and 8-bit synaptic weight, and the output spike event is encoded in a 13-bit pre-synaptic neuron address.

The neuron core 130 includes a configuration register 131, an idle timer 132, an array timer 133, first-in, first-out (FIFO) 134, a comparator 135, a spike arbitrator 136, a gain controller 137, an event controller 138, and an SRAM 139. Hereinafter, descriptions of conventionally used components will be omitted, and main features and related parts of the present invention will be mainly described. Components whose description is omitted can be easily recognized by those skilled in the art.

The configuration register 131 sets various parameters that define neural and synaptic dynamics, such as a refractory period of neurons, the membrane time constant of neurons, the threshold value of neurons, the reset value of neurons, and the synaptic gain. The array timer 133 is a 15-bit counter indicating a current time of a neuron core. The current time $t_{now}$ is used as a time bias ($T_{\tau_m}(t_{now})$) converting a neuron state value at $t=t_{now}$ into a value at $t=0$. Five MSBs of the timer are arranged according to an exponent of a neural state variable. Subtracting an integer from the exponent of the floating point number is the same as dividing by two of the floating point number. Therefore, exponential decay is implemented with simple integer subtraction. The time resolution of the counter is set based on the membrane time constant. For example, when the membrane time constant is 20 ms, the time resolution of the counter is 0.0195 ms. At this resolution, the counter is set to count 5 MSBs once every 20 ms. The event controller 138 controls the input synaptic event, evaluates the neuron state for the input synaptic event, and generates an output spike when the membrane potential exceeds a threshold. The output spike is registered in a spike arbitration module, and the output spike is provided to other cores through the synaptic connectivity table 110 whenever the event router 143 is available.

Hereinafter, experimental results performed based on the neuron model according to an embodiment of the present invention will be described. First, the setup of the present experiment will be described. The present experiment implemented a new neuron model using the time-embedded floating point arithmetic and tested its dynamics under various conditions. To extend to the large-scale neuromorphic system, a neuron model was realized in a part of the neuron core of the large-scale neuromorphic system illustrated in FIG. 5. A core group with a total of 8,192 neurons was implemented in a field-programmable gate array (FPGA) device, i.e., Xilinx XC7K160T.

The expected benefits to power consumption of the new neuron model using the time-embedded floating point arithmetic were evaluated, and the neuron model from the synaptic dynamics level to the neuron network dynamics level was tested. The experiment results show floating point temporal dynamics and synaptic dynamics enhanced by the time-embedded floating-point arithmetic according to the present embodiment. In addition, the experiment results show the neural dynamics in response to the excitatory and inhibitory input synaptic events. In addition, the experiment results show the neural network dynamics using a biological plausible feed-forward neuron network. In all the experiments, a Poisson spike generator implemented in the FPGA was used to generate a Poisson input spike train for the core group, and the output spike response was measured to analyze the neural and synaptic dynamics.

Figure 6:
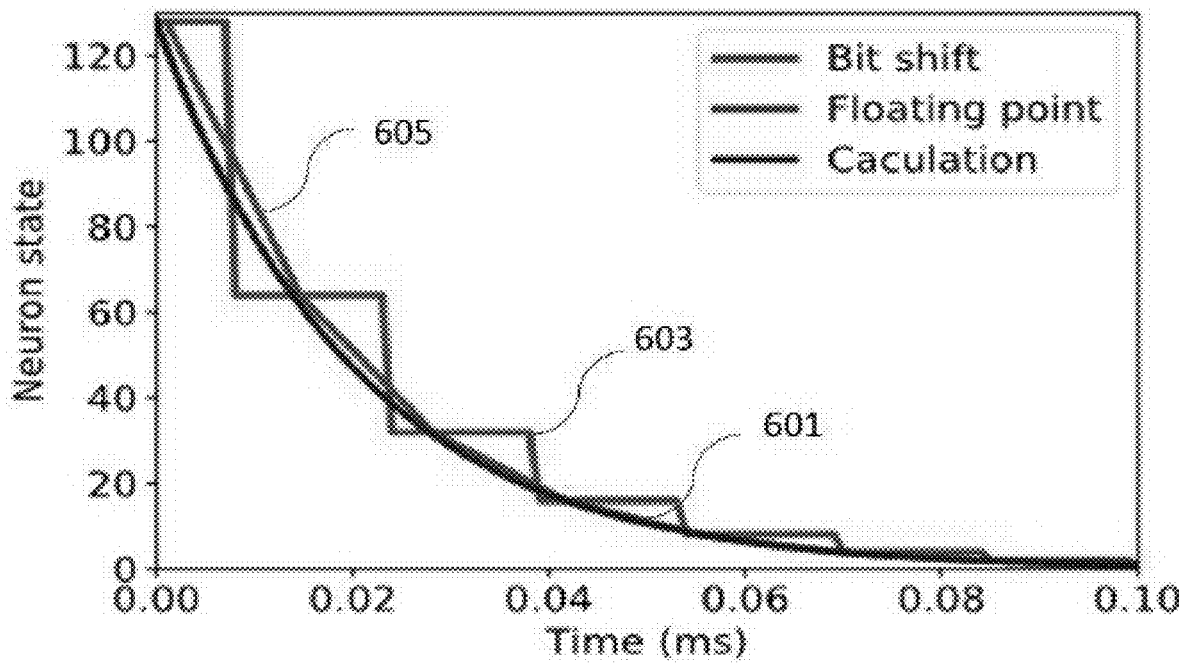
FIG. 6 is a diagram illustrating an example of an exponential leakage mechanism implemented in various number systems according to an embodiment of the present invention.

FIG. 6 illustrates an example of an exponential leakage mechanism implemented in various number systems according to an embodiment of the present invention. Referring to FIG. 6, a blue line 601 is a calculated exponential function with a time constant of 20 ms. 7 bits are used to represent the state over time. In a system using an integer system, in order to implement exponential leakage while minimizing power consumption, the exponential function is roughly approximated to a function divided by two which may be implemented as a multiplier-less operation such as a right shift operation. It is represented as a cascading function as the function indicated by the red line 603 but loses the temporal dynamics compared to the exponential function. On the other hand, using the floating point number, the exponential leakage may be more accurately approximated to an exact exponential function, as indicated by a green line 605. This may be implemented by the integer subtraction from the floating point number. This operation may be implemented without the multiplier and floating point operation. The integer subtraction operation consumes similar power to the right shift operation. This means that, according to an embodiment of the present invention, better temporal dynamics may be achieved with the floating point number without a disadvantage to power consumption.

Figure 7:
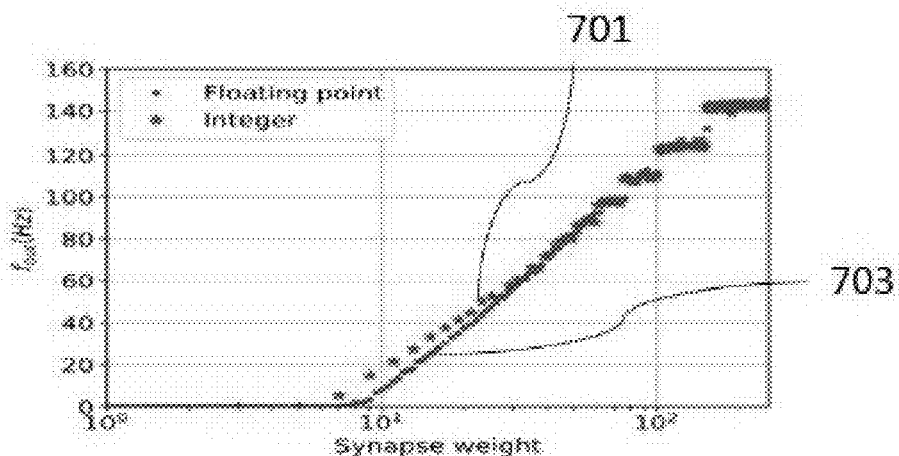
FIG. 7 is a diagram illustrating a neural response curve using different number systems according to an embodiment of the present invention.

The leak mechanism affects the precision of synaptic dynamics as described below. FIG. 7 illustrates a neural response curve showing the precision of synaptic dynamics measured in an experimental setup using two different number systems according to an embodiment of the present invention. Referring to FIG. 7, a magenta line 701 is a neural response curve of the integer system, and a green line 703 is a neural response curve of the floating point number system. Each curve is the output response to the spike rate. When the neuron model uses the integer system (701), the membrane potential of the neuron is decayed very roughly with a bit right shift, resulting in the membrane potential of the neuron being divided by two for every value of the membrane time constant. This phenomenon is the loss of time dynamics for the membrane time constant. As a result, the dynamic range of the synaptic weight is reduced, and thus, as illustrated in FIG. 7, the neurons respond in a stepwise manner at a high synaptic weight (701). On the other hand, it can be seen that the neuron responses are evenly distributed in the floating point number system (703). As a result, it can be seen that the floating point synapses provide better synaptic precision and neuron response range with the same number of bits.

Figure 8A:
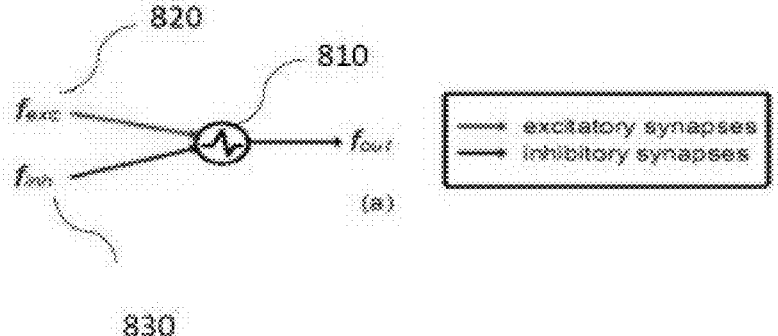
FIGS. 8A and 8B are diagrams illustrating neural responses in response to excitatory and inhibitory synaptic events at various input rates according to an embodiment of the present invention.
Figure 8B:
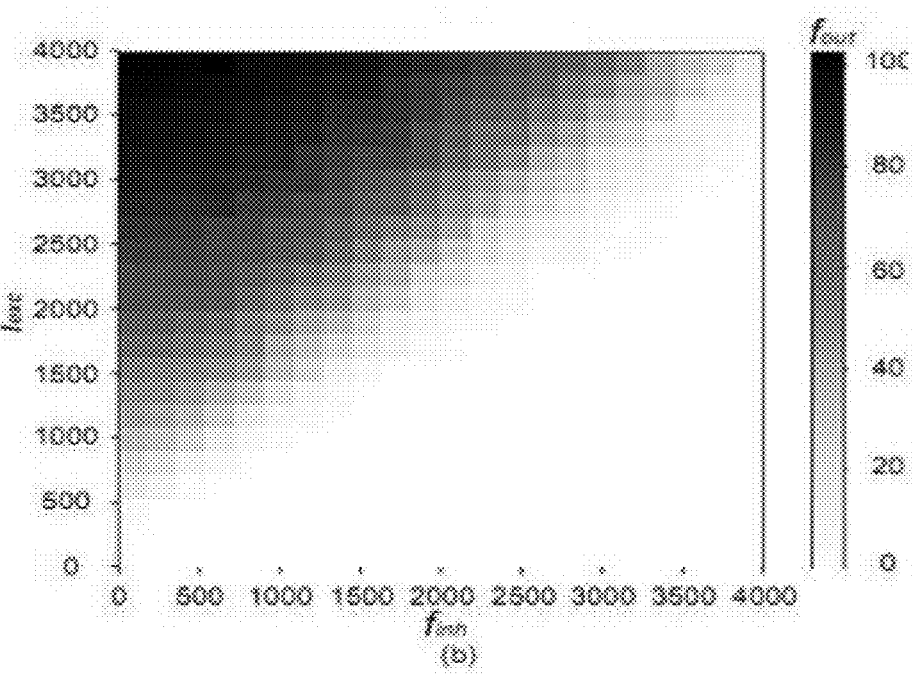

FIGS. 8A and 8B are diagrams illustrating neural responses in response to excitatory and inhibitory synaptic events at various input rates according to an embodiment of the present invention. FIG. 8A is a wiring diagram of an experimental setup for measuring a neural response. Referring to FIG. 8A, a neuron 810 is stimulated by an excitatory synapse 820 and an inhibitory synapse 830 using an input spike train distributed in a Poisson distribution. FIG. 8B is a diagram illustrating measurement results of output spike rates corresponding to different rates of the excitatory synapse 820 and the inhibitory synapse 830 in the range of 0 to 4,000 Hz. In the present experiment, neurons were stimulated by different excitatory synapses 820 and inhibitory synapses 830 in the range of 0 to 4,000 Hz, a neuron threshold value was 256, a neuron's refractory period was 5 ms, and a neuron's membrane time constant is 20 ms. In FIG. 8B, a dark area indicates better response than a bright area. The measured output response shows the effect of inhibitory synaptic events. When the proposed neuron model works properly, the inhibitory synaptic event will linearly suppress the output neural activity with respect to the excitatory synaptic event, and it may be confirmed from the results of this experiment that neurons respond appropriately as expected.

Figure 9A:
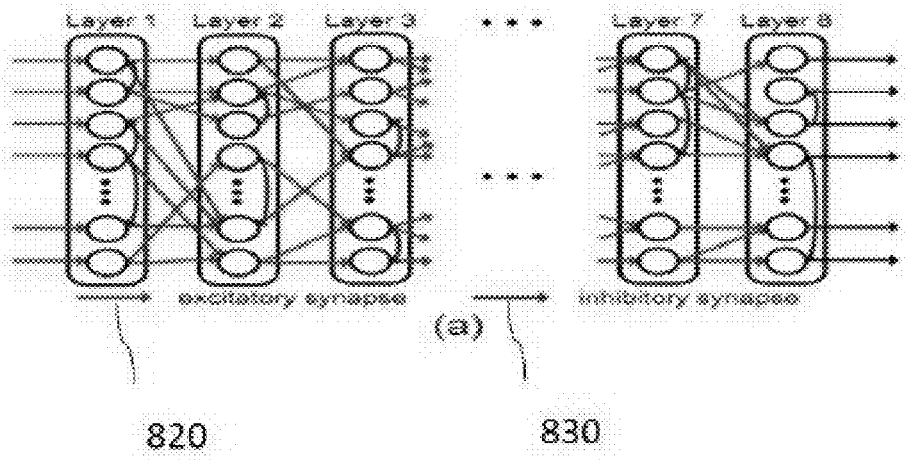
FIG. 9A is a wiring diagram of a synchronous firing neuron chain according to an embodiment of the present invention.
Figure 9B:
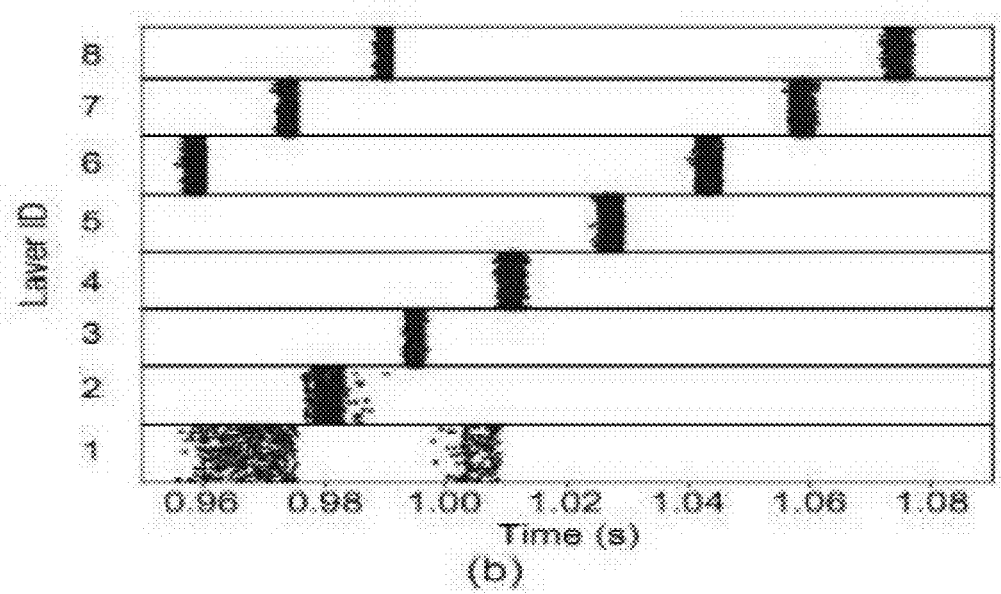
FIG. 9B is a diagram illustrating a measured neural activity of the synchronous firing neural chain according to the present embodiment.

The neural network dynamics are verified by the activity of the synchronous firing chain. The synchronous firing chain is a biological plausible neural network that synchronously propagates neural impulses through a feed-forward network of multi-layer neurons. FIG. 9A is a wiring diagram of the synchronous firing chain according to an embodiment of the present invention. Referring to FIG. 9A, the feed-forward neuron network includes eight layers, each layer including 1,024 neurons and connected to neurons in a next layer through the excitatory synapse 820. An excitatory synaptic connection to neurons in a next layer is randomly made with 10 ms axonal conduction delay with a probability of 10%. In addition, there is a connection of an inhibitory synapse 830 between neurons of the same layer for lateral inhibition. FIG. 9B is a diagram illustrating a measured neural activity of the synchronous firing neural chain according to the present embodiment. FIG. 9B illustrates a raster plot of the output spike measured in neurons in eight layers. Here, it may be seen that the spike activity is properly propagated through the feed-forward layer.

One of the advantages of the algorithm according to the present invention is to reduce the dynamic power consumption that is achieved by the time-embedded floating point arithmetic. The floating point arithmetic is known as high energy cost computation in digital hardware and is not popularly used to achieve low power design in the neuromorphic system. Indeed, however, the operation of reading and storing the SRAM memory consumes more energy than the floating point operation, and the dominant factor in the total energy cost for implementing neurons is the number of SRAM access operations.

In the related art, the temporal dynamics such as the membrane leakage of neurons were implemented by calculating the membrane potential at every time step. This requires additional SRAM access to read neural state variables such as the membrane potential and the timestamp at every time step. Then, based on the neuron's timestamp information, the neuron status, such as membrane potential, is evaluated. On the other hand, the neuron implementation model according to an embodiment of the present invention uses the time-embedded floating point arithmetic that shares the neuron's membrane potential and timestamp information, and thus, does not require additional SRAM access until another synaptic event is received.

Figure 10:
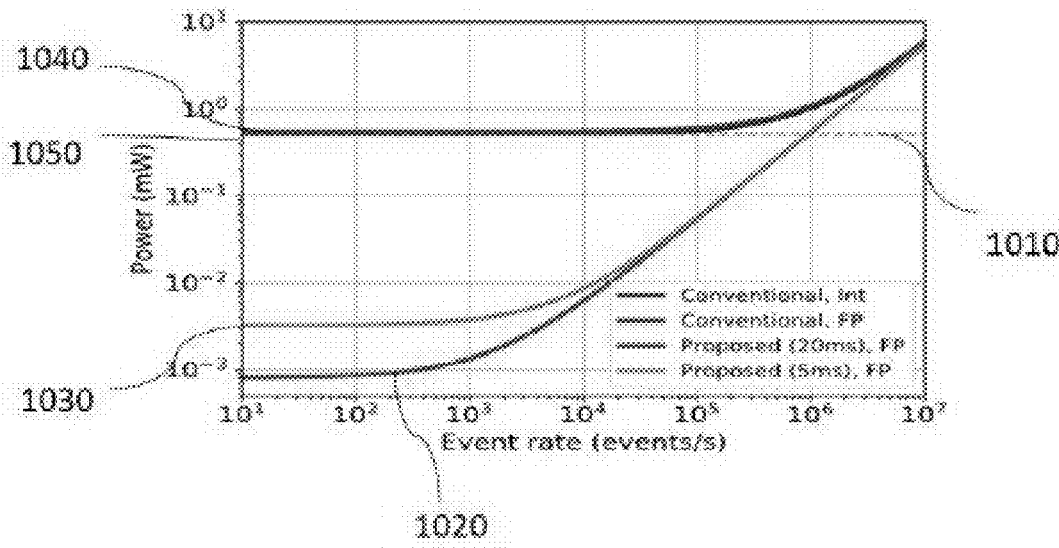
FIG. 10 is a diagram illustrating an estimate of dynamic power consumption of a neuron core.

FIG. 10 is a diagram showing an estimate of the dynamic power consumption of the neuron core, and illustrates the comparison of the estimated power consumption cases when each of the algorithm according to the present invention and the algorithm of the related art is applied. In FIG. 10, the estimate is a calculated value according to various input synaptic event rates under experimental conditions with 1,024 neurons in a neuron core with a membrane time constant of 20 ms. Under these conditions, the algorithm according to the present invention needs to access the SRAM every 640 ms to correct the stored state variables, and the algorithm according to the related art needs to access the SRAM at every time step (generally, 1 ms). The energy cost of each operation is summarized in Table 1 below.

TABLE 1

| Operation | Energy Per Operation |
| --- | --- |
| 8-bit integer addition | 0.03 pJ |
| 16-bit integer addition | 0.05 pJ |
| 16-bit floating point addition | 0.4 pJ |
| SRAM reading | 5 pJ |

In FIG. 10, a dotted line 1010 represents the estimated power consumption criterion required for the operation to access the membrane potential of all neurons of the SRAM at every time step. A red line 1020 is a value estimated from the membrane time constant of 20 ms, and a cyan color 1030 is a value estimated from the membrane time constant of 5 ms. As illustrated in FIG. 10, the algorithm according to one embodiment of the present invention is expected to consume much less dynamic power than the conventional algorithms 1040 and 1050 at low input event rates. The algorithm according to an embodiment of the present invention is designed to access all elements of the SRAM in every cycle of the array timer 133.

The cycle is defined by the membrane time constant. As shown in FIG. 10, the longer time constant ($\tau$=20 ms) provides a lower power consumption criterion than the shorter case ($\tau$=5 ms). In addition, it may be seen that the power consumption increases according to the event rate. At a 1 MHz event rate, the power consumption estimated from the algorithm according to the present embodiment meets the estimated power consumption criterion 1010 required for the operation to access the membrane potential of all neurons in the SRAM at every time step, but is only half the power consumption of the conventional algorithms. Also, even in the case of a 10 MHz event rate, the algorithm according to this embodiment consumes less dynamic power. In a neuron core with 1,024 neurons, a 10 MHz event rate means that each neuron in a core receives an average of 10,000 synaptic events per second. This is almost the maximum limit for stimulating a neuron, and typically each neuron receives about 1,000 to 5,000 synaptic events per second. Therefore, it is expected that the algorithm according to the present embodiment consumes less power than the conventional algorithm in almost all operation conditions.

In addition, a core group with 8 neuron cores may be implemented in Xilinx XC7K160T, an FPGA device, and Table 2 shows the FPGA utilization results

TABLE 2

| Module | Slice LUTs | Slice Register | Slice | Block RAM |
| --- | --- | --- | --- | --- |
| NC | 945(0.93%) | 537(0.26%) | 377(1.49%) | 0.5(0.15%) |
| FPU | 385(0.38%) | 58(0.03%) | 144(0.57%) | 0(0%) |

The algorithm according to the present embodiment may share membrane potential value and time stamp information through the time-embedded floating point arithmetic, thereby optimizing the use of internal SRAM (0.5 block RAM) in the FPGA device for the neuron core. In addition, the simplified floating point number system lowers the implementation cost of the floating point unit.

The present specification proposes a new neuron implementation algorithm using time-embedded floating point arithmetic and shows that a neuron core group may be implemented as an array including 8,192 neurons. This implementation example was tested through the experiments from the synaptic dynamics level to the neuron network dynamics level. The time-embedded floating point calculation method is used to integrate the time information in the membrane potential value, and uses the array timer to share the reference time across all neurons, thereby eliminating the need for the additional memory space to store timestamps per neuron. In addition, this method eliminates the need for the additional SRAM access at every time step to evaluate the neuron state, thereby reducing the dynamic power consumption while achieving the floating point precision neural and synaptic dynamics.

According to the improved neuron implementation model of the present invention, since a time-embedded floating point number shares temporal information with a membrane potential, it is possible to minimize memory usage for neuron state variables. In addition, since no additional access to an SRAM is required at every time step, it is possible to reduce dynamic power consumption even when using floating point precision neural and synaptic roles.

Although various embodiments of the present invention have been described above, these various embodiments are not necessarily implemented alone, and two or more embodiments may be combined. Although embodiments of the present invention have been described in detail hereinabove, the scope of the present invention is not limited thereto, but may include several modifications and alterations made by those skilled in the art using a basic concept of the present invention as defined in the claims.

What is claimed is:

1. A method of operating a neuron in a neuromorphic system, comprising:

evaluating a membrane potential value at a corresponding time when receiving an input spike;

time-modulating a synaptic weight of the membrane potential value at the corresponding time and converting the time-modulated synaptic weight into a membrane potential value at a reference time; and generating an output spike when the membrane potential value at the reference time exceeds a certain threshold value;

wherein the time-modulating the synaptic weight of the membrane potential value at the corresponding time includes representing the membrane potential value at the corresponding time in a floating-point format including time information, the time information being represented as a time bias derived from a timer and reflected in the floating-point format by an integer addition operation, and accessing a memory to scan neural state variables corresponding to the membrane potential value at the corresponding time only when the timer is updated to "0", and updating a neural state variable in response to an input event.

2. The method of claim 1, wherein the synaptic weight is converted into the membrane potential value at the reference time by adding the time bias to the synaptic weight.

3. The method of claim 2, further comprising:

modulating a synaptic weight of a new input spike into the reference time using a second time bias when the new input spike is received;

adding the modulated synaptic weight of the new input spike to the membrane potential value at the reference time; and generating an output spike when the added modulated synaptic weight of the new input spike exceeds the certain threshold value.

4. The method of claim 1, wherein the membrane potential value at the reference time is represented by a floating point number including a predetermined bit of exponent and a predetermined bit of mantissa.

5. The method of claim 4, wherein the floating point number includes the time information.

6. The method of claim 5, wherein the time information is valid for a timer cycle.

7. A neuron core unit comprising:

a timer that indicates a current time of a neuron core;

a controller configured to, upon receipt of an input synaptic event, convert a membrane potential value at the current time indicated by the timer into a membrane potential value at a reference time for an input synaptic event and to output an output spike when a membrane potential value at the reference time exceeds a certain threshold value; and a memory that includes a neural state variable;

wherein the controller, to convert the membrane potential value at the current time indicated by the timer into the membrane potential value at the reference time and to output the output spike, represents the membrane potential value at the current time indicated by the timer in a floating-point format including time information, the time information being represented as a time bias derived from the timer and reflected in the floating-point format by an integer addition operation, accesses the memory and scans neural state variables corresponding to the membrane potential value at the current time indicated by the timer only when the timer is updated to "0" or in response to an input event.

8. The neuron core unit of claim 7, wherein the synaptic weight is converted into the membrane potential value at the reference time by adding the time bias to the synaptic weight.

9. The neuron core unit of claim 8, wherein the controller modulates a synaptic weight of a new input spike into the reference time using a second time bias when the new input spike is received, adds the modulated synaptic weight of the new input spike to the membrane potential value at the reference time, and generates an output spike when the added modulated synaptic weight of the new input spike exceeds a certain threshold value.

10. The neuron core unit of claim 7, wherein the membrane potential value at the reference time is represented by a floating point number including a predetermined bit of exponent and a predetermined bit of mantissa.

11. The neuron core unit of claim 10, wherein the floating point number includes the time information.

12. The neuron core unit of claim 11, wherein the time information is valid for a timer cycle.

* * * * *